(12) United States Patent
Notagashira

(10) Patent No.: US 6,545,806 B2
(45) Date of Patent: Apr. 8, 2003

(54) BINOCULARS

(75) Inventor: Hidefumi Notagashira, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/544,118

(22) Filed: Apr. 6, 2000

(65) Prior Publication Data

US 2002/0196544 A1 Dec. 26, 2002

(30) Foreign Application Priority Data

Apr. 19, 1999 (JP) ............................................. 11-110534

(51) Int. Cl.[7] .......................... G02B 27/64; G02B 23/00
(52) U.S. Cl. ...................... 359/557; 359/407; 359/554
(58) Field of Search ................................. 359/405–409, 359/554–557, 694–704; 396/52–55; 348/208; 250/201.1–205

(56) References Cited

U.S. PATENT DOCUMENTS 5,633,756 A * 5/1997 Kaneda et al. ............... 359/554
5,672,862 A * 9/1997 Ohara et al. ................. 250/204

FOREIGN PATENT DOCUMENTS

| JP | 7-43645 | * 2/1995 | ................. 359/554 |
| JP | 10-333200 | 12/1998 | |

* cited by examiner

Primary Examiner—Thong Nguyen
(74) Attorney, Agent, or Firm—Fitzpatrick, Cella, Harper & Scinto

(57) ABSTRACT

Binoculars includes a pair of objective optical units, a pair of eyepiece lens units for observing an image formed by the pair of the objective optical units, a pair of corrective optical units, respectively arranged in optical paths of the pair of the objective optical units, for correcting image blurring by changing the optical paths, a lock member that is shifted between a locked position in which an operation for changing the optical path of each of the corrective optical units is locked and an unlocked position in which the operation for changing the optical path is unlocked, a driver for driving the lock member to one of the locked position and the unlocked position, and a control member for activating the drive operation by the driver.

14 Claims, 16 Drawing Sheets

MOTION IN DIRECTION OF PITCH (LOCK LEVER IN UNLOCKED STATE)

BINOCULARS

BACKGROUND OF THE INVENTION

1. Field of the Invention

The present invention relates to binoculars.

2. Description of the Related Art

A variety of binoculars having an image stabilization function have been proposed. Japanese Patent Laid-Open No. 10-333200, assigned to the same assignee of this invention, discloses binoculars having a lock member that is interlocked with an image stabilizer, an urging member, etc.

In the above binoculars, the lock member that locks the operation of the image stabilizer is interlocked with a control member by way of a plate spring, and the control member is pressed by a finger to unlock the image stabilizer. The control member needs to be modestly pressed against the urging of the spring. While the image stabilizer remains operative, the finger needs to continuously press the control member. Observing an image for a long period of time while the image stabilizer operates is inconvenient, and there is room for improvement in this respect.

SUMMARY OF THE INVENTION

It is an object of the present invention to provide binoculars which present ease of use of a control member for activating an image stabilizer while providing comfort in the observation of images using an image stabilizer for a long period of time.

Binoculars of the present invention includes a pair of objective optical units, a pair of eyepiece lens units for observing an image formed by the pair of the objective optical units, a pair of corrective optical units, respectively arranged in optical paths of the pair of the objective optical units, for correcting image blurring by changing the optical paths, a lock member that is shifted between a locked position in which an operation for changing the optical path of each of the corrective optical units is locked and an unlocked position in which the operation for changing the optical path is unlocked, a driver for driving the lock member to one of the locked position and the unlocked position, and a control member for activating the drive operation by the driver.

Preferably, the driver includes a motor and a cam linked to the motor, and the position of the lock member is changed in response to the rotation of the cam.

Preferably, the control member is a control switch for producing a control signal, and drives the driver in response to the control signal when the control switch is operated.

Preferably, the control member is a control switch for producing a control signal, and comprises a controller which releases the lock member from the locked position in response to the control signal when the lock member is in the locked position, and starts a corrective operation by the pair of the corrective optical units.

It is also preferred that the control member is a control switch for producing a control signal, and comprises a controller which stops the corrective operation by the pair of the corrective optical units in response to the control signal when the lock member is in the unlocked position and drives the driver to put the lock member into the locked position.

DESCRIPTION OF THE PREFERRED EMBODIMENTS

First Embodiment

Figure 16A:
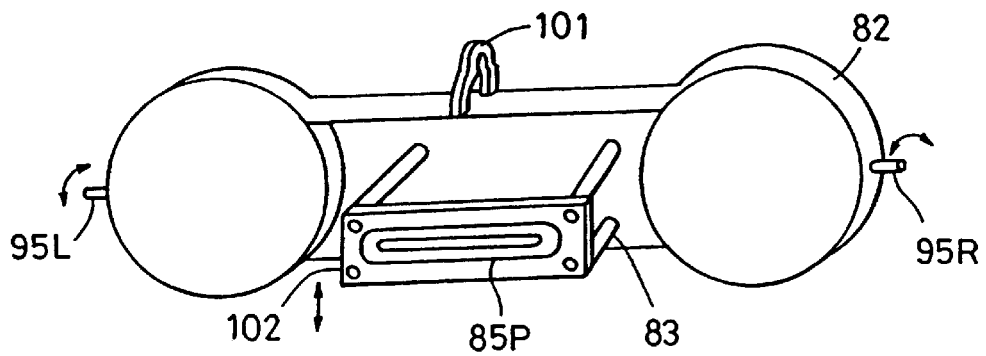
FIGS. 16A, 16B, and 16C show major portions of the present invention.
Figure 16B:
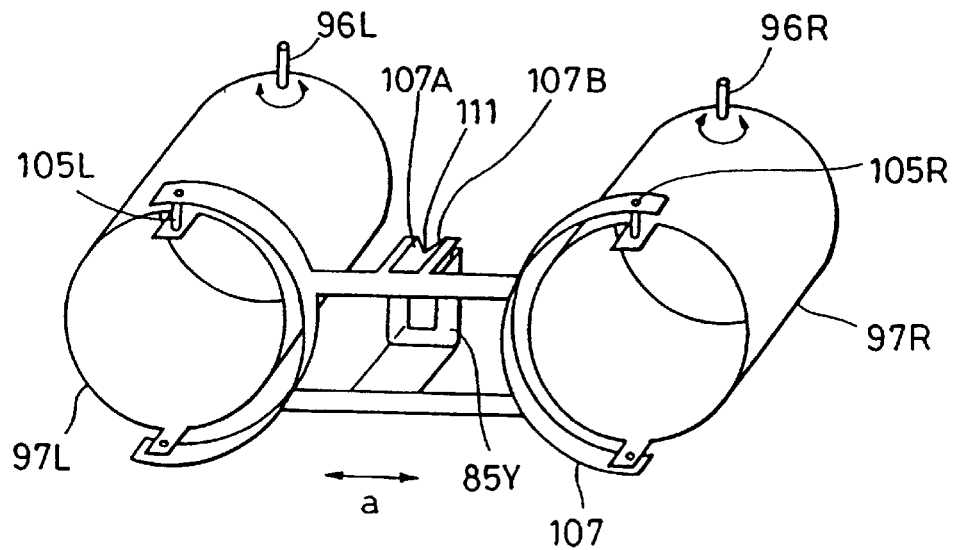
Figure 16C:
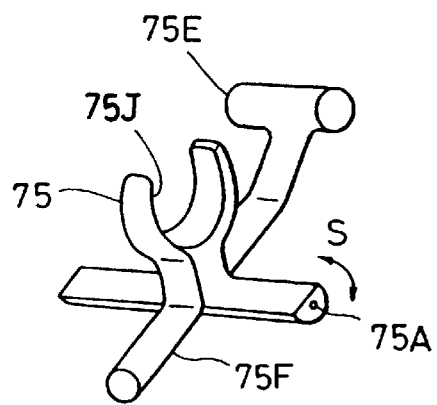

Major portions of the present invention are shown in FIGS. 16A, 16B, and 16C are first discussed, although embodiments of the present invention will be discussed in detail later.

FIG. 16A shows a mechanism for driving the front face of variable apex-angle prisms, which are a stabilization unit. The mechanism exhibits an anti-vibration effect against vibrations in the direction of pitching. A pitch holding frame 82 supports and rotates the front faces of a pair of right and left variable apex-angle prisms, about shafts 95R and 95L. A pitch drive frame 102, which is connected to the pitch holding frame 82 through four posts, holds a pitch drive coil 85$p$. When a current is conducted through the pitch drive coil 85$p$ in response to an output from a pitch direction touch sensor, the pitch drive frame 102 is pivoted downward or upward about the shafts 95R and 95L.

When the pitch drive frame 102 is driven downward or upward, the pitch holding frame 82 is pivoted about the shafts 95R and 95L, thereby controlling image blurring.

FIG. 16B shows a mechanism that drives the rear faces of the variable apex-angle prisms, as the stabilization unit, and has the function of the anti-vibration effect against the yawing. Yaw holding frames 97R and 97L support the rear faces of the pair of the apex-angle prisms, and are respectively rotated about shafts 96R and 96L. A yaw drive frame 107 is rotatably supported by shafts 105R and 105L on the yaw holding frames 97R and 97L, and support a yaw drive coil 85y. When a current is conducted to the yaw drive coil 85y in response to the output of a yaw direction touch sensor, the yaw drive frame 107 is driven to the right and left, as shown by arrow "a".

When the yaw drive frame 107 is driven to the right and to the left, the right and left yaw holding frames 97R and 97L are pivoted about the shafts 96R and 96L, thereby controlling image blurring due to yaw movement. A plurality of projections (75F and 75E) formed on a lock lever 75 are disengaged from the yaw drive frame 107 and the pitch holding frame 82 while the image stabilization function is operative as shown in FIG. 16C. During the stop of the operation of the stabilization period, the projections 75F and 75E are engaged with the yaw drive frame 107 and the pitch holding frame 82, thereby mechanically locking the yaw drive frame 107 and the pitch holding frame 82. To this end, yaw movement restraint portions 107A and 107B, recess 111 (as discussed in more detail below) and a pitch movement restraint portion 101 are respectively provided. Specifically, a cylindrical projection 75F of the lock lever 75 is engaged with the yaw movement restraint portions 107A and 107B, and recess 111, and the cylindrical projection 75E is engaged with the pitch movement restraint portion 101 formed on the pitch holding frame 82. The lock lever 75 is driven in a seesaw movement by an offset cam 65 about the shaft 75a thereof. With the lock lever 75 pivoted in the directions of an arrow S by the offset cam 65, the yaw drive frame 107 and the pitch holding frame 82 are concurrently locked.

As will be discussed later, the lock lever 75 is driven by a motor in interlock with a stabilization switch 66. The yaw drive frame 107 and the pitch holding frame 82 are put into a stabilization enabled state. During a stabilization disabled state, the respective restraint portions of the yaw drive frame 107 and the pitch holding frame 82 are locked.

The above arrangement is now discussed in detail.

Figure 1:
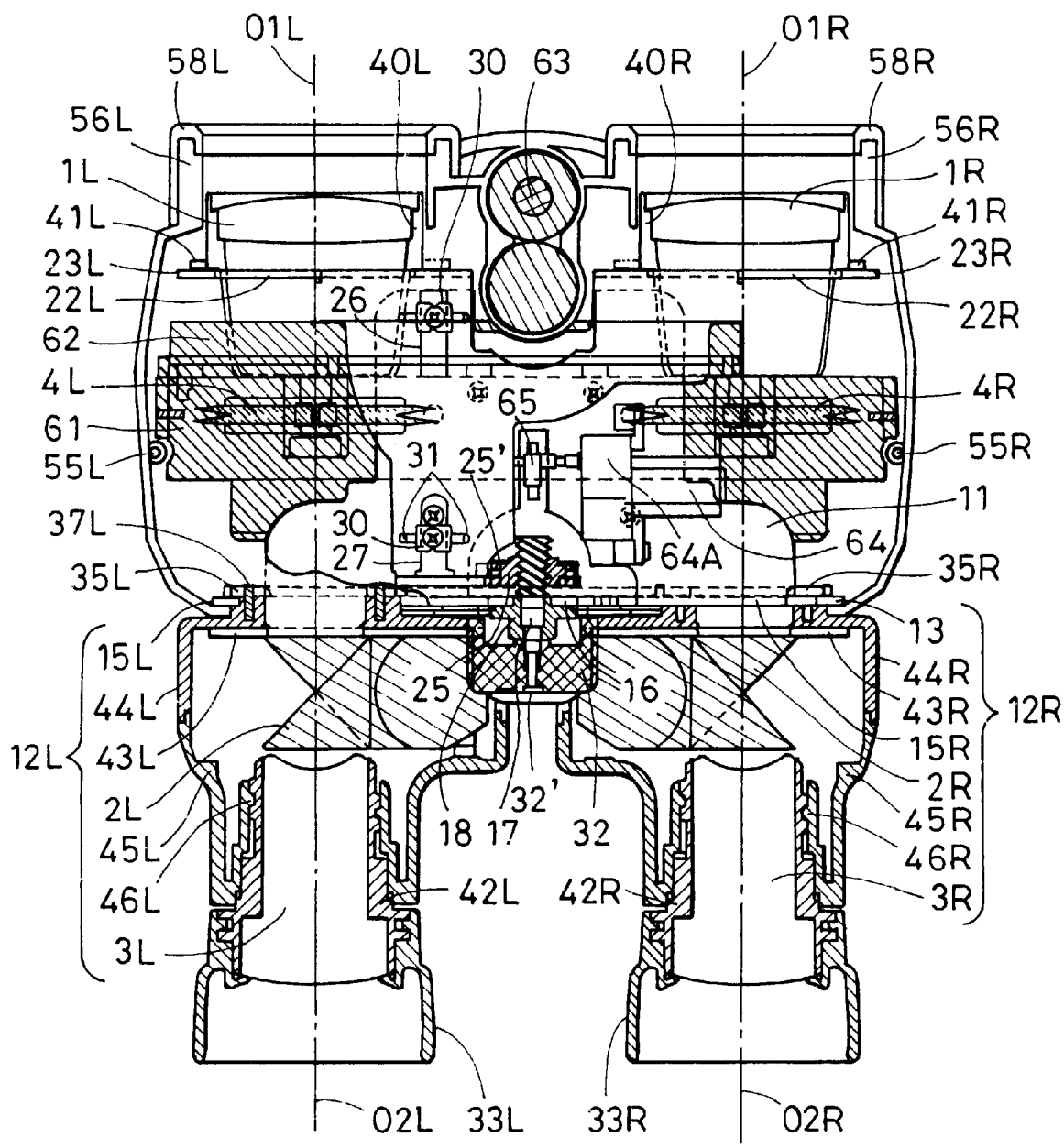
FIG. 1 is a horizontal sectional view of binoculars of a first embodiment of the present invention, viewed from above.
Figure 2:
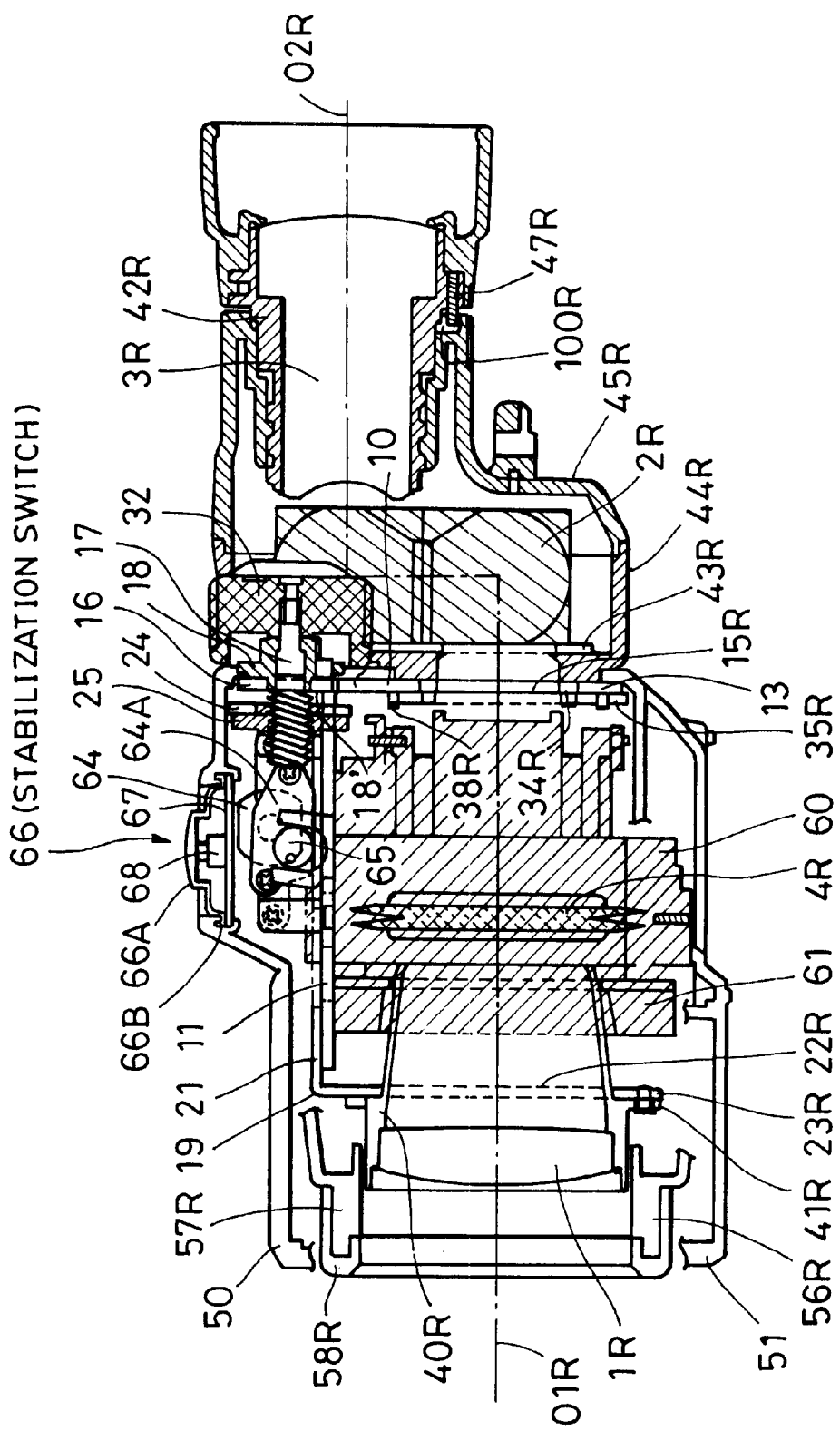
FIG. 2 is a vertical sectional view of the binoculars, viewed from the side.
Figure 3:
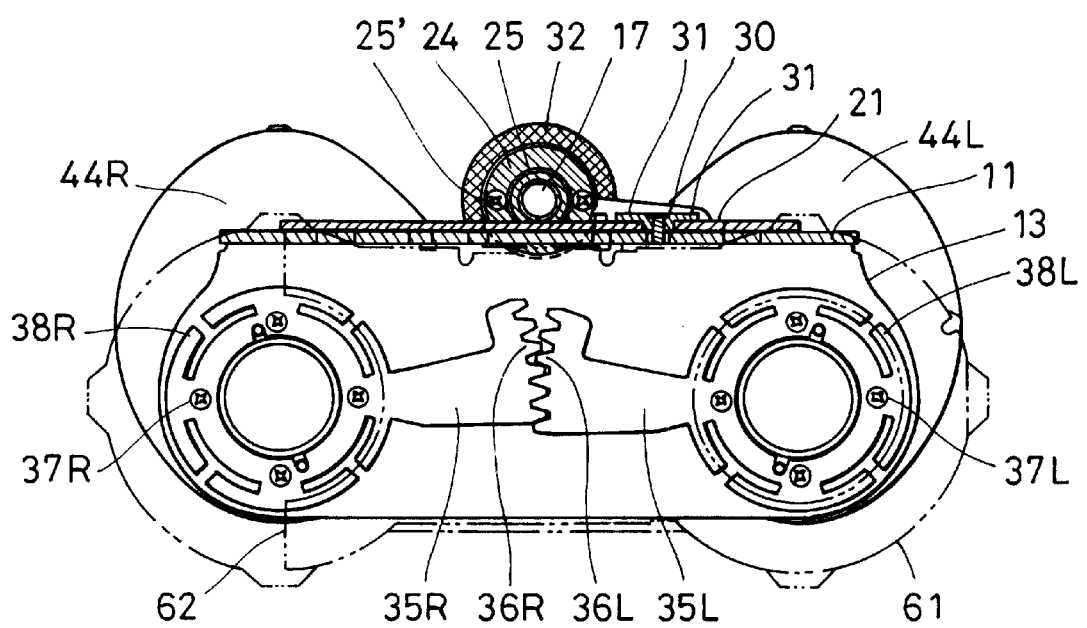
FIG. 3 is a vertical sectional view of the binoculars, viewed from behind.

FIG. 1 through FIG. 3 show prism binoculars having an anti-vibration unit (an image stabilization unit) of a first embodiment of the present invention. FIG. 1 is a horizontal sectional view of the binoculars. FIG. 2 is a vertical sectional view of the binoculars, viewed from the side thereof, and FIG. 3 is a vertical sectional view of the binoculars, viewed from the back thereof.

The optical system of the binoculars includes a pair of left and right objective lenses 1L and 1R, a pair of left and right Porro 2 type erecting prisms 2L and 2R, a pair of left and right eyepiece lenses 3L and 3R, and a pair of variable-angle prisms 4L and 4R, each having an encapsulated fluid.

Referring to FIG. 1 through FIG. 3, the objective lenses 1L and 1R respectively have a pair of left and right parallel optical axes 01L and 01R. The optical axes respectively extend through the centers of the variable-angle prisms 4L and 4R, and respectively reach the incident surfaces of the pair of the erecting prisms 2L and 2R. Optical axes 02L and 02R of the pair of the left and right eyepiece lenses 3L and 3R, which are respectively in parallel with but not collinear with the optical axes 01L and 01R of the objective lenses, extend from the exit surfaces of the left and right erecting prisms 2L and 2R.

The body 10 of the binoculars is formed of a robust metal plate (see FIG. 2), and includes a horizontal portion 11 in parallel with the plane in which the optical axes 01L and 01R lie, and a support surface 13, perpendicular to the horizontal portion 11, for supporting eyepiece units 12L and 12R. Slide holes 15L and 15R are arranged centered on the optical axes 01L and 01R in the support surface 13. The support surface 13 extends upward as a projection 16. A holder member 18 is affixed to the projection 16 using a screw 18', and the holder member 18 receives a focus screw 17.

A mount 19 is fabricated of a robust metal, and includes a horizontal portion 21 in sliding engagement with the sliding portion 11 of the body 10, and holder surfaces 23L and 23R, perpendicular to the optical axes 01L and 01R, and having holes 22L and 22R respectively centered on the optical axes 01L and 01R. A center back portion 24 perpendicular to the horizontal portion 21 is provided with a nut 25 affixed thereto by a screw 25'. The nut 25 has an internal thread which the focus screw 17 is screwed into. The focus screw 17 is engaged with the inner circumference of the holder member 18 of the projection 16 of the body 10.

The horizontal portion 21 of the mount 19 has guide slots 26 and 27 facing the optical axes 01L and 01R. Two guide members 30, which are dimensioned to be engaged with the guide slots 26 and 27, are bolted to the horizontal portion 11 of the body 10. Part of the guide member 30 laterally extends on both sides, thereby forming a spring portion 31. The spring portion 31 in the vicinity of each of the guide slots 26 and 27 functions to appropriately press the horizontal portion 21 of the mount 19 against the horizontal portion 11 of the body 10.

The mount 19 is supported slidably in the direction of the optical axis relative to the body 10, by the two guide members 30 engaged with the guide slots 26 and 27.

The focus screw 17 is rotatably supported within the holder member 18 of the projection 16 of the body 10. A focus knob 32 is attached to the rear end of the focus screw 17 by a screw 32' so that the focus knob 32 may not come off in the direction of the optical axis. The focus screw 17 rotates in a fixed position relative to the body 10, and the thread portion thereof is screwed into the nut 25 affixed to the center back portion 24 perpendicular to the horizontal portion 21 of the mount 19. By turning the focus knob 32, the mount 19 is moved in the direction of the optical axis relative to the body 10. The focus screw 17 has two flat portions on the rear end thereof, and the focus knob 32 is machined to match the flattened portions of the focus screw 17. With the screw 32' tightened, the focus screw 17 and the focus knob 32 are integrally rotated.

The pair of the left and right eyepiece units 12L and 12R are symmetrically shaped, and respectively include the eyepiece lenses 3L and 3R, symmetrically shaped left and right eyepiece lens barrels 42L and 42R for respectively integrally supporting the eyepiece lenses 3L and 3R, a pair of Porro 2 type erecting prisms 2L and 2R having the incident surfaces thereof respectively aligned with the optical axes 01L and 01R and the exit surfaces thereof respectively aligned with the optical axes 02L and 02R of the eyepiece lenses 3L and 3R, support frames 43L and 43R for respectively supporting the Porro 2 type erecting prisms 2L and 2R that are attached thereto using an adhesive agent, eyepiece unit bodies 44L and 44R which respectively hold and adjust the support frames 43L and 43R for each of the prisms 2L and 2R, and eyepiece holders 45L and 45R respectively engaged with and affixed to the eyepiece unit bodies 44L and 44R with a plurality of screws.

The eyepiece holders 45L and 45R have helicoidal threads 46L and 46R, and are respectively engaged with the outer circumferences of the eyepiece lens barrels 42L and 42R.

The eyepiece holder 45L and the eyepiece lens barrel 42L are glued to each other after both are adjusted in the direction of the optical axis.

A circularly running cutout 100R is formed on the rear end of the eyepiece holder 45R, and the end of the cutout 100R serves as a rotation limiter for a stopper pin 47R planted in the eyepiece barrel 42R. With the eyepiece lens barrel 42R rotated within a range limited by the rotation limiter, left and right diopters of the binoculars are adjusted when in use.

A pair of eyepiece rubbers 33L and 33R are respectively attached to the rear ends of the eyepiece lens barrels 42L and 42R.

Provided on the front ends of the eyepiece unit bodies 44L and 44R are flange portions 34L and 34R that extend from the support surface 13 that is perpendicular to the horizontal portion 11 of the body 10. The flange portions 34L and 34R are respectively engaged with the slide holes 15L and 15R respectively centered on the optical axes 01L and 01R. The eyepiece lens unit bodies 44L and 44R are respectively provided with a pair of left and right link plates 35L and 35R having generally symmetrical shapes as shown in FIG. 3. The link plates 35L and 35R are linked with each other with the gear portions 36L and 36R thereof engaged with each other.

The link plates 35L and 35R are bolted to the flange portions 34L and 34R at the front ends of the pair of the left and right eyepiece lens units 44L and 44R by four screws 37L and 37R. Outer circular portions 38L and 38R, outside the screw tightened area of the link plates 35L and 35R, extend outwardly. When bolted, the outer circular portions 38L and 38R are properly deflected toward the support surface 13 of the body 10 to be tilted to the optical axes 01L and 01R.

In the arrangement of the eyepiece section, the pair of the eyepiece units 12L and 12R rotate oppositely from each other in close contact with the support surface 13 perpendicularly extending from the horizontal portion 11 of the body 10. The distance between the optical axes 02L and 02R of the eyepiece lenses 3L and 3R is thus adjusted by a predetermined distance with a proper resistance.

The objective lens barrels 40L and 40R respectively hold the objective lenses 1L and 1R at the front ends thereof. The flange portions 41L and 41R of the objective lens barrels 40L and 40R are bolted to support surfaces 23L and 23R having holes 22L and 22R respectively centered on the optical axes 01L and 01R. The holes 22L and 22R centered on the optical axes 01L and 01R have a diameter slightly larger than the diameter of the objective lens barrels 40L and 40R. When the objective lens barrels 40L and 40R are bolted, the optical axes 01L and 01R of the objective lenses 1L and 1R are slightly deviated in position and then fixed.

A top cover 50 and a bottom cover 51, shown in FIG. 2, are generally engaged with each other in a plane in which the optical axes 01L and 01R lie. The top cover 50 covers the body 10, the focus screw 17, the mount 19, and the objective lens barrels 40L and 40R, and is bolted to the body 10.

The bottom cover 51 is entirely engaged with the top cover 50 except the objective lens barrels 40L and 40R, the eyepiece units 12L and 12R, and the focus screw 17, and is bolted to the top cover 50 at two mounting holes 55L and 55R. Semicylindrical end portions 56L and 56R of the bottom cover 51 and semicylindrical end portions 57L and 57R of the top cover 50 are respectively engaged, forming left and right cylindrical end portions. Objective covers 58L and 58R are fitted with the cylindrical end portions.

Arranged deep behind the objective lenses 1L and 1R is an anti-vibration unit (an image stabilization unit) 61 having variable-angle prisms 4L and 4R. An electrical circuit board 62 is mounted on the image stabilization unit 61. A battery 63 is arranged between the objective lens barrels 40L and 40R. The electrodes of the battery 63 are connected to the electrical circuit board 62 via leads (not shown).

A stabilizating switch 66 (a control member) serves as a switch for permitting to be operative a drive actuator of the image stabilization unit 61 including the variable-angle prisms 4L and 4R. The drive mechanism of the image stabilization unit 61 will be discussed later in detail.

The stabilization switch 66 is covered with a rubber member having a proper hardness, and internally houses an electrical switch 68. The stabilization switch 66 is secured together with a pressure plate 67 within a hole formed in the center of the top cover 50 with the flange portion 66A thereof clamped from within. By pressing a control section 66A with a finger from outside, the electrical switch 68 is also pressed. With the finger detached from the control section 66A, the stabilization switch 66 recovers the state shown in FIG. 2 by the elastic force of the flange portion 66B.

A motor 64 (drive means) rotates a cam 65 through a gear unit 64A. The motor 64 is bolted to the horizontal portion 11 of the body 10.

The construction of the image stabilization unit 61 is now discussed, referring to FIG. 4 through FIG. 7.

Figure 4:
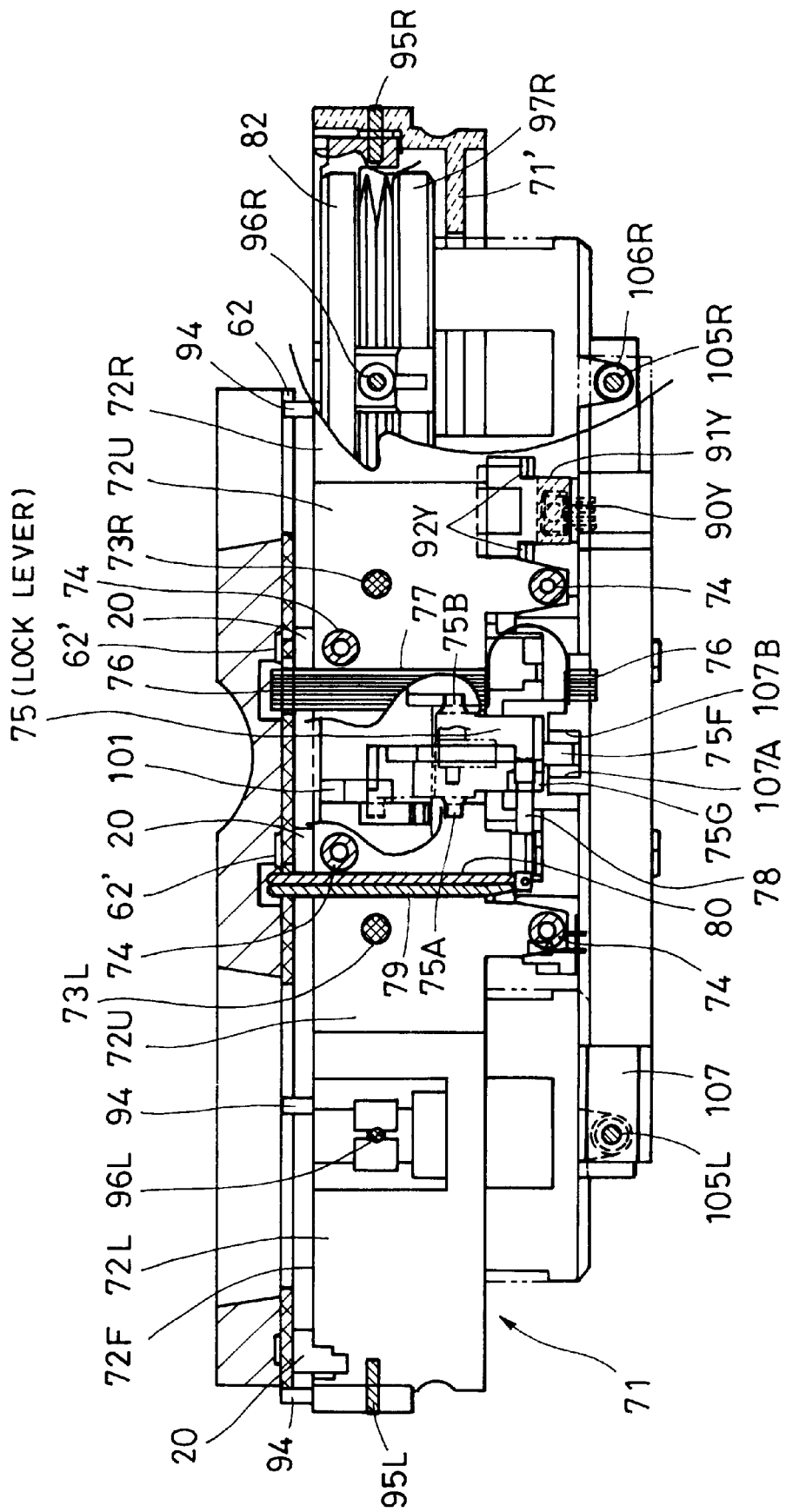
FIG. 4 is a sectional view of a stabilization unit contained in the binoculars shown in FIG. 1.
Figure 5:
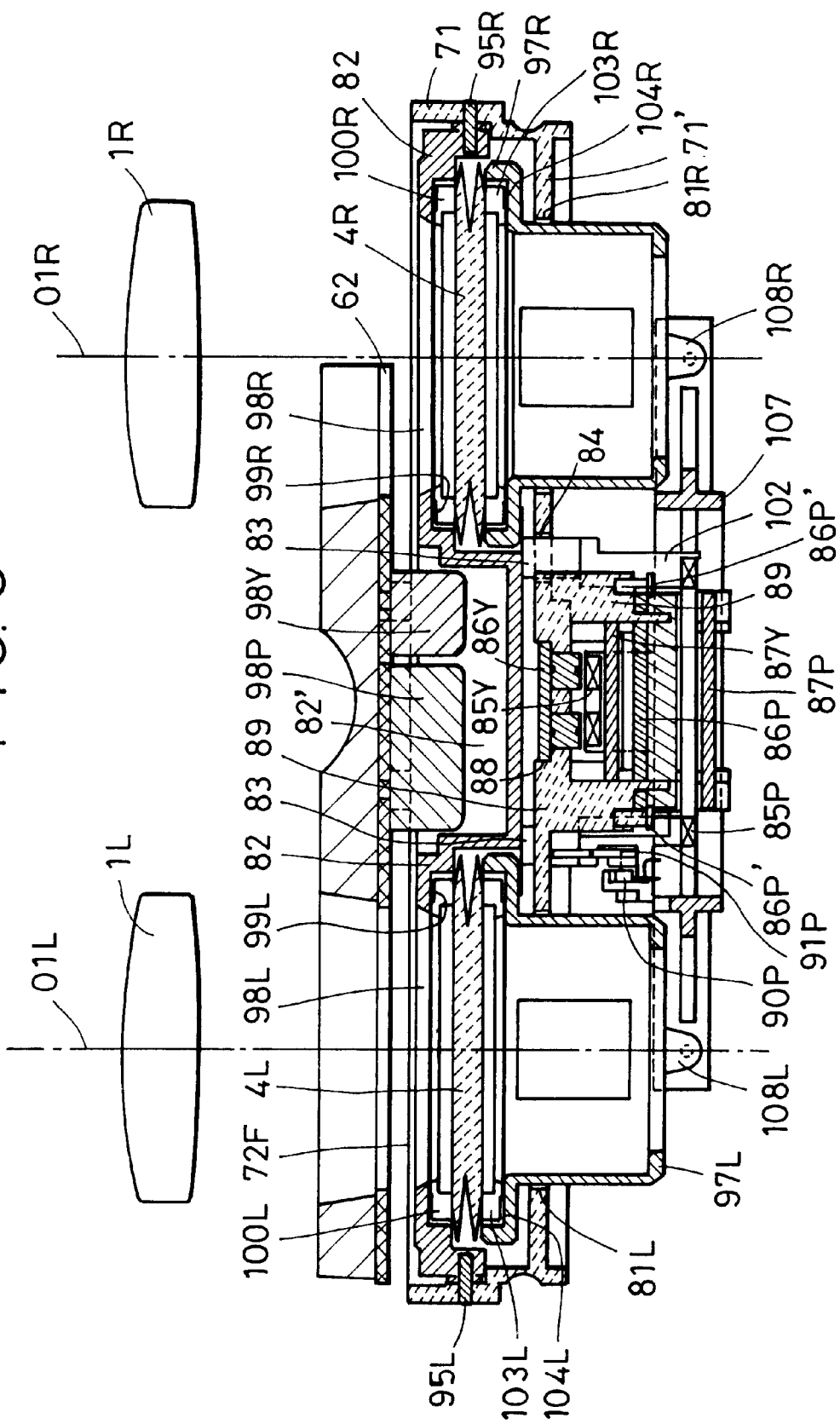
FIG. 5 is a horizontal sectional view of the stabilization unit of FIG. 4, viewed from above.
Figure 6:
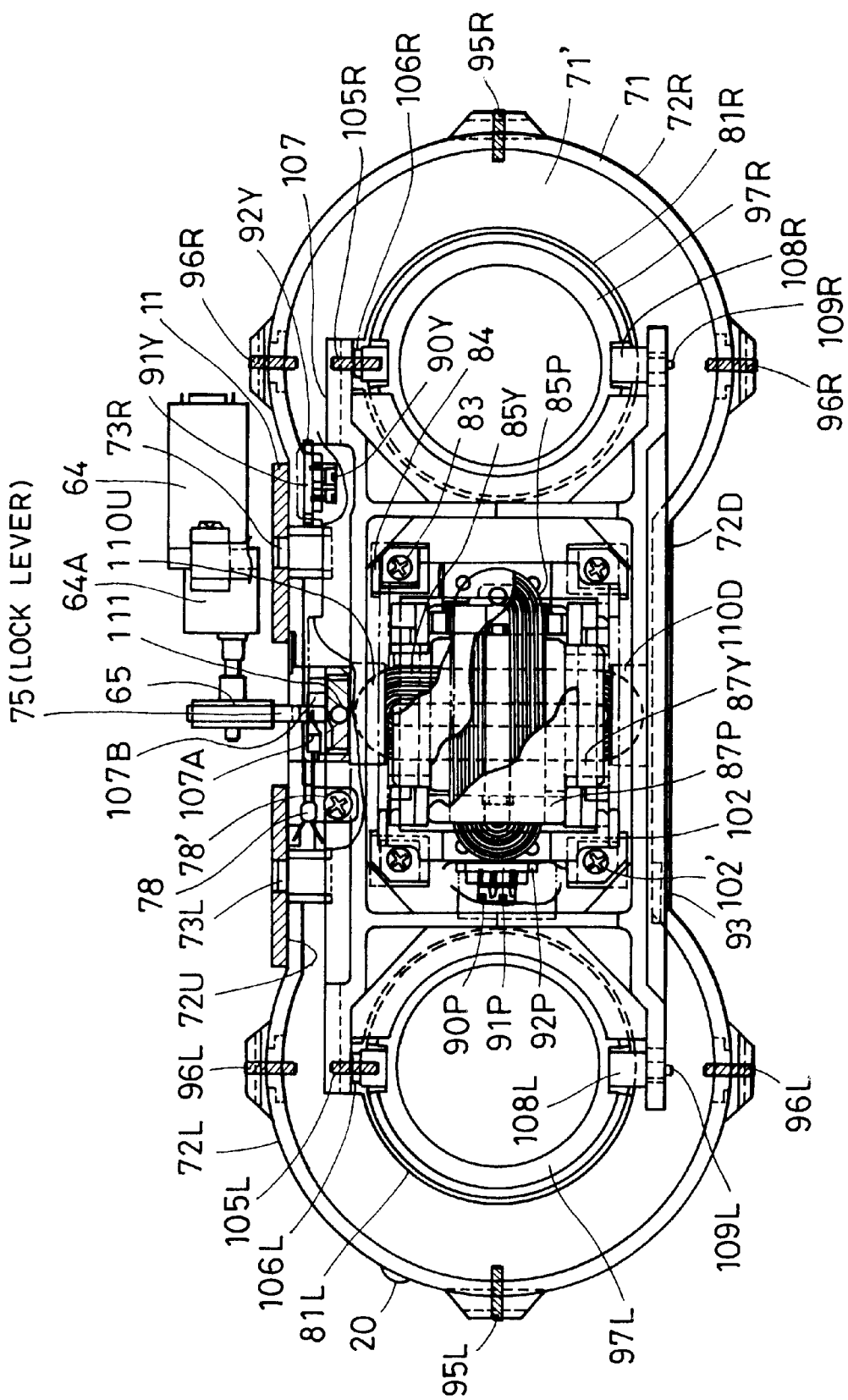
FIG. 6 is a vertical sectional view of the stabilization unit of FIG. 4, viewed from behind.
Figure 7:
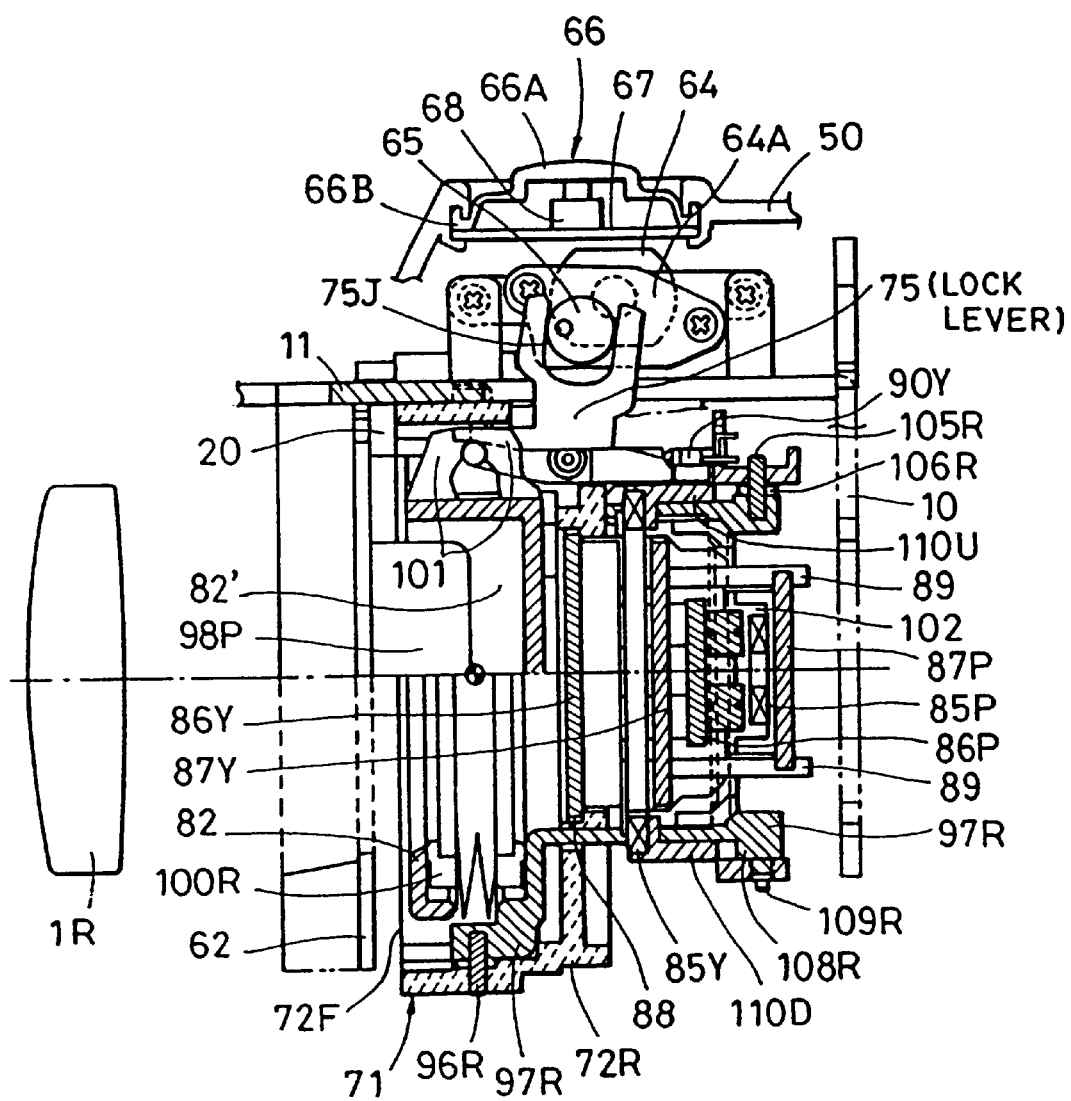
FIG. 7 is a vertical sectional view of the stabilization unit of FIG. 4, viewed from the side.

FIG. 4 is a horizontal sectional view of the stabilization unit 61, FIG. 5 is a horizontal sectional view of the stabilization unit 61, FIG. 6 is a vertical sectional view of the stabilization unit 61, viewed from behind, and FIG. 7 is a vertical sectional view of the stabilization unit of FIG. 4, viewed from side.

The body 71 of the image stabilization unit 61 is generally bilaterally symmetrical in shape, and includes left and right cylindrical portions 72L and 72R respectively centered on the optical axes 01L and 01R, and slightly recessed upper planar portion 72U and lower planar portion 72D which connect the left and right cylindrical portions 72L and 72R. The upper planar portion 72U is supported by the horizontal portion 11 of the body 10. The body 71 also includes a flange portion 71'.

Arranged on the upper planar portion 72U of the body 71 are two positioning pins 73L and 73R for positioning the horizontal portion 11 of the body 10 during mounting, four seats 74 on the upper surface thereof, a groove 77 for mounting a Y flexible board 76 for transmitting a yaw drive signal and a detected signal, and a groove 80 for passing therethrough a lead 79 from a leaf switch 78 (switch means).

A U-shaped cam slide portion 75J is formed in the lock lever 75. A cam 65 arranged on the gear unit 64A of the motor 64 is received within the cam slide portion 75J. Along with the driving of the motor 64, the lock lever 75 is pivoted.

Formed in the flange portion 71' of the body 71 are holes 81L and 81R respectively centered on the optical axes 01L and 01R, and four central rectangular holes 84 through which four drive columns 83 of a pitch holding frame 82 pass. Also arranged on the flange portion 71' are a central hole 88 for holding pitch magnet yokes 86P and 87P and yaw magnetic yokes 86Y and 87Y for forming magnetic fields for imparting drive power to a pitch drive coil 85P and a yaw drive coil 85Y, a magnet holder including columns 89 surrounding the central hole 88, a seat 92P on which a magnet yoke 91P for forming a magnetic field for a pitch Hall element 90P, namely, a position detector element mounted on a moving member is mounted, and a seat 92Y on which a magnet yoke 91Y for forming a magnetic field to the a yaw Hall element 90Y is mounted. A screw 78' secures the leaf switch 78 to the flange portion 71' in the vicinity of the groove 80 for passing the lead 79 therethrough.

Formed on the lower planar portion 72D of the body 71 is a groove 93 (not shown) into which a P flexible board for transmitting a pitch drive signal and a detected signal is glued, like the groove 77 formed in the upper planar portion 72U.

Arranged on a front surface 72F of the body 71 are five internally threaded embosses 20 for securing the electrical circuit board 62 with screws: two in the upper planar portion 72U, two in the lower planar portion 72D, and in the left cylindrical portion 72L. The front surface 72F also has three pins 94 for positioning and bolting the electrical circuit board 62.

The left and right cylindrical portions 72L and 72R of the body 71 have six shaft receiving holes for receiving rotary shafts at the center of travel in the direction of the optical axis. The portion surrounding each hole in the cylindrical portions 72L and 72R is slightly thickened outwardly. Pins 95L and 95R are press-fitted into the shaft receiving holes aligned perpendicular to the optical axes 01L and 01R and coplanar with the optical axes of 01L and 01R in a manner that allows the pins 95L and 95R to rotate. Pins 96L are press-fitted into the shaft receiving holes aligned perpendicular to and coplanar with the optical axis 01L in such a manner that allows the pins 96L to rotate and pins 96R are press-fitted into the shaft receiving holes aligned perpendicular to and coplanar with the optical axis 01R in such a manner that allows the pins 96R to rotate. The press-fitted pins 95L and 95R serve as an axis of rotation of the pitch holding frame 82, and the press-fitted pins 96L and 96R serve as an axis of rotation of the yaw holding frames 97L and 97R.

The electrical circuit board 62 is a two-sided board, and is shaped not to interfere with light rays in the vicinity of the optical axes 01L and 01R. The electrical circuit board 62 is mounted on the body 71 by six mounting screws 62', while being aligned by three positioning pins 94.

Gyroscopes 98P and 98Y are mounted generally in the center of the bottom side of the electrical circuit board 62 (to the side of the eyepiece lenses 3L and 3R) to detect a correction value for hand shake. The gyroscopes 98P and 98Y are designed to be seated within a recessed portion 82' in the pitch holding frame 82.

Figure 8:
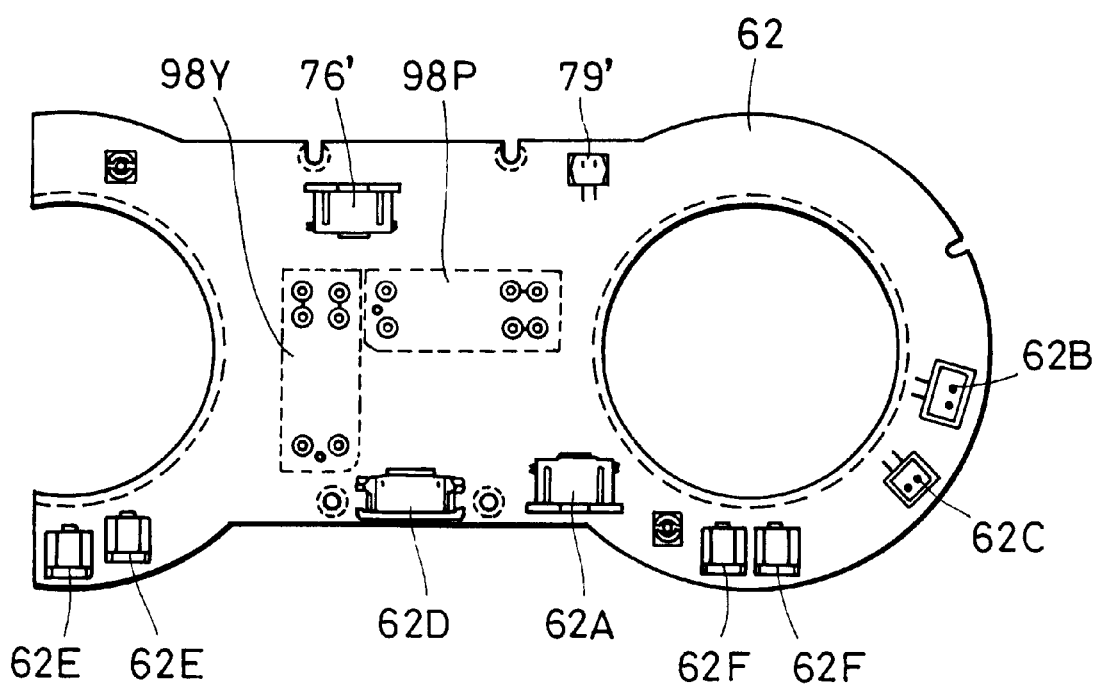
FIG. 8 is a front view of an electrical printed circuit board of the stabilization unit of FIG. 4.

Referring to FIG. 8, arranged on the front side of the electrical circuit board 62 are connectors including a connector 79' for the lead 79 routed from the leaf switch 78, a connector 76' for the Y flexible board 76, a connector 62B for leads routed from a power supply (not shown), a connector 62C for LEDs (not shown) which light during the stabilization operation, and a connector 62D for leads routed from the stabilization switch 66.

Further arranged on the front side of the electrical circuit board 62 are a total four adjusting potentiometers including a stabilization gain adjusting potentiometer 62E (for pitching and yawing) and a stabilization center adjusting potentiometer 62F (for pitching and yawing).

The pitch holding frame 82 includes front frames 100L and 110R for the variable-angle prisms 4L and 4R containing an encapsulated fluid, and drives these components. Referring to FIG. 5, the pitch holding frame 82 has the central recessed portion 82', and the four drive columns 83 on the rear side thereof. The pitch holding frame 82 is rotatably supported by the body 71 about the press-fitted pins 95L and 95R in the direction of pitching.

The pitch holding frame 82 also has circular windows 98L and 98R centered on the left and right optical axes 01L and 01R. The pitch holding frame 82 is attached to the front frames 100L and 100R of the variable-angle prisms 4L and 4R on the rear side thereof using an adhesive agent or bayonet. Referring to FIG. 7, the pitch movement restraint portion 101 is arranged in the upper center. The pitch movement restraint portion 101 is engaged with the lock lever 75 during the locked state thereof and functions as a rotation limiter during the unlocked state thereof.

The pitch drive frame 102 includes the pitch drive coil 85P for driving the pitch drive frame 102 and the pitch Hall element 90P for detecting a drive quantity. The pitch drive frame 102 is fixed by the lock lever 75 while the stabilization function is not performed. The pitch drive frame 102 is shaped to be generally rectangular as shown in FIG. 6, and is secured to the four drive columns 83 on the rear side of the pitch holding frame 82 by four screws 102'. The pitch drive coil 85P is glued onto the rear surface of the pitch drive frame 102 using an adhesive agent. The pitch drive frame 102 has the leftwardly projecting pitch Hall element 90P in alignment with the magnet yoke 91P. The pitch drive frame 102 is connected to the P flexible board (not shown) for electrical signals for the pitch drive coil 85P and the pitch Hall element 90P.

The yaw holding frames 97L and 97R respectively support the rear frames 103L and 103R of the variable-angle prisms 4L and 4R, and drive the rear frames 103L and 103R. The yaw holding frame 97L is rotatably supported relative to the body 71 in the direction of yawing by the pins 96L press-fitted into the top end and the bottom end of the yaw holding frame 97L. The yaw holding frame 97R is rotatably supported relative to the body 71 in the direction of yawing by the pins 96R press-fitted into the top end and the bottom end of the yaw holding frame 97R. The yaw holding frames 97L and 97R has support surfaces 104L and 104R, which are respectively in alignment with and glued onto the rear frames 103L and 103R of the variable-angle prisms 4L and 4R. The rearwardly extending yaw holding frames 97L and 97R are kept away from the optical paths centered on the optical axes 01L and 01R, and respectively hold connecting shafts 105L and 105R press-fitted therein. The connecting shafts 105L and 105R are respectively received in the connecting holes in the corresponding positions in the yaw drive frame 107. The connecting holes are spaced by the same distance between the optical axes 01L and 01R. Rear bottom portions 108L and 108R are respectively provided with connecting projections 109L and 109R that are engaged with holes formed in the yaw drive frame 107. In other words, the yaw holding frames 97L and 97R and the yaw drive frame 107 form a parallel link mechanism.

The yaw drive frame 107 supports the yaw drive coil 85Y for driving the yaw holding frames 97L and 97R and a yaw Hall element 90Y for detecting a drive quantity. When the stabilization function is not used, the yaw drive frame 107 is fixed by the lock lever 75.

The yaw drive frame 107 has a generally rectangular central portion as shown in FIG. 6, and has four extending arms that are interlocked with the yaw holding frames 97L and 97R. As shown in FIG. 7, the yaw drive frame 107 has two forwardly extending arms 110U and 110D, which support the yaw drive coil 85Y. As shown in FIG. 6, the yaw drive frame 107 has a yaw limiting portion 111 on the center front top portion thereof. The yaw limiting portion 111 is engaged with the lock lever 75 during a locked state, and works as a rotation limiter during an unlocked state, as shown in FIG. 6. The yaw drive frame 107 has also the yaw Hall element 90Y in a position corresponding to the magnet yoke 91Y. The yaw drive frame 107 is connected to the Y flexible board 76 for electrical signals for the yaw drive coil 85Y and the yaw Hall element 90Y.

The pitch holding frame 82, the pitch drive frame 102, the yaw holding frames 97L and 97R, the yaw drive frame 107 and components attached thereto, are thus assembled into the body 71 of the image stabilization unit 61. The image stabilization unit 61 concurrently drives the front frames 100L and 100R of the variable-angle prisms 4L and 4R by the same angle in the direction of pitching, and concurrently drives the rear frames 103L and 103R by the same angle in the direction of yawing.

The lock lever 75 is switched between the locked state and the unlocked state by the pivotal motion thereof which is activated by the interlocking action between the cam driven by the motor 64 and the cam slide portion 75J of the lock lever 75.

A lock mechanism for the locking operation and the unlocking operation of the image stabilization unit 61 is now discussed in detail.

When the lock lever 75 performs no stabilization function (during the locked state), the pitch drive frame 102 and the yaw drive frame 107 are fixed to the respective positions thereof to keep the variable-angle prisms 4L and 4R in a parallel and coplaner state. During the stabilization state (the unlocked state), the leaf switch 78 is turned on, allowing the pitch drive frame 102 and the yaw drive frame 107 to perform the predetermined stabilization function within the limitation of an operative range.

Figure 9:
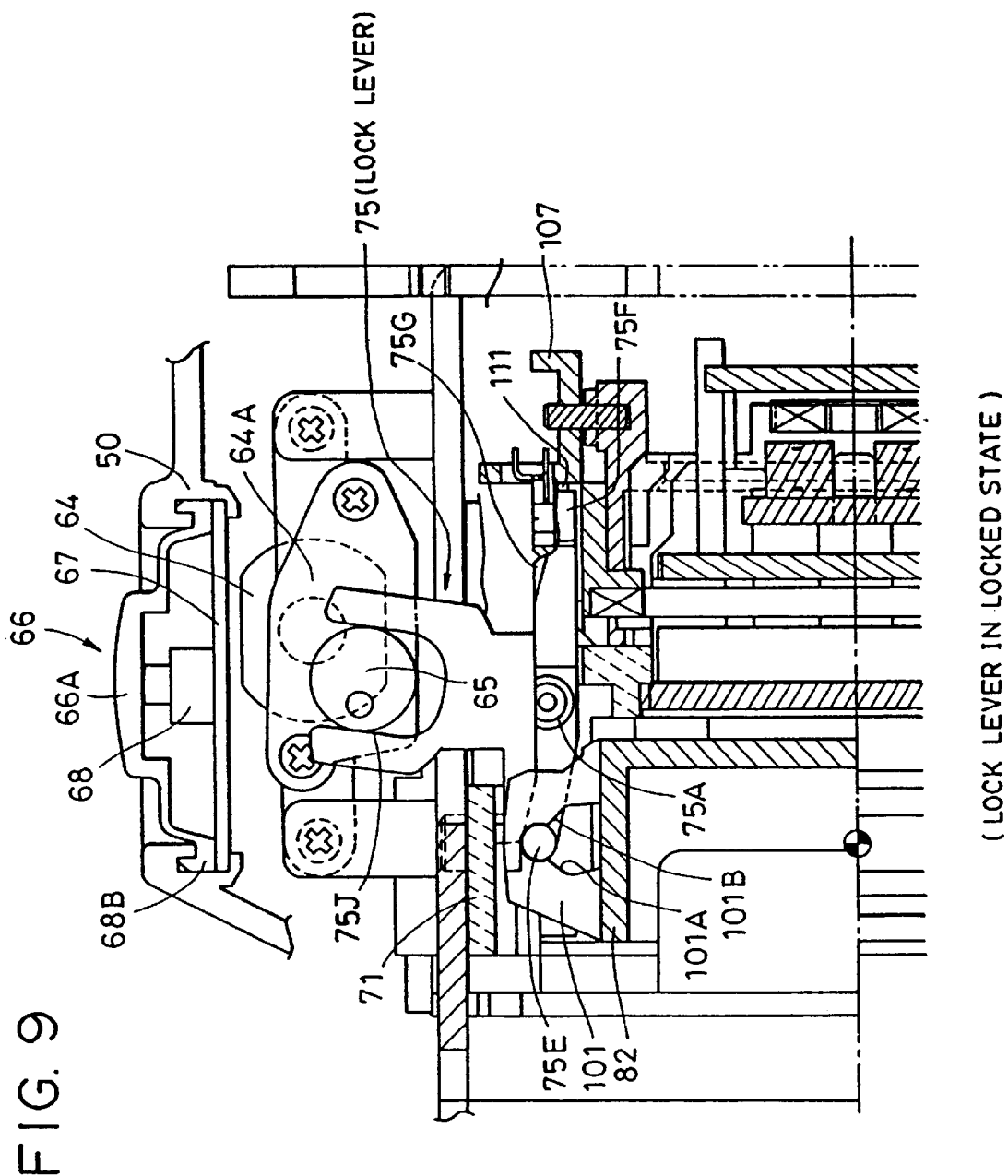
FIG. 9 is an enlarged side sectional view showing a locked state of a lock mechanism contained in the binoculars of FIG. 1.
Figure 10:
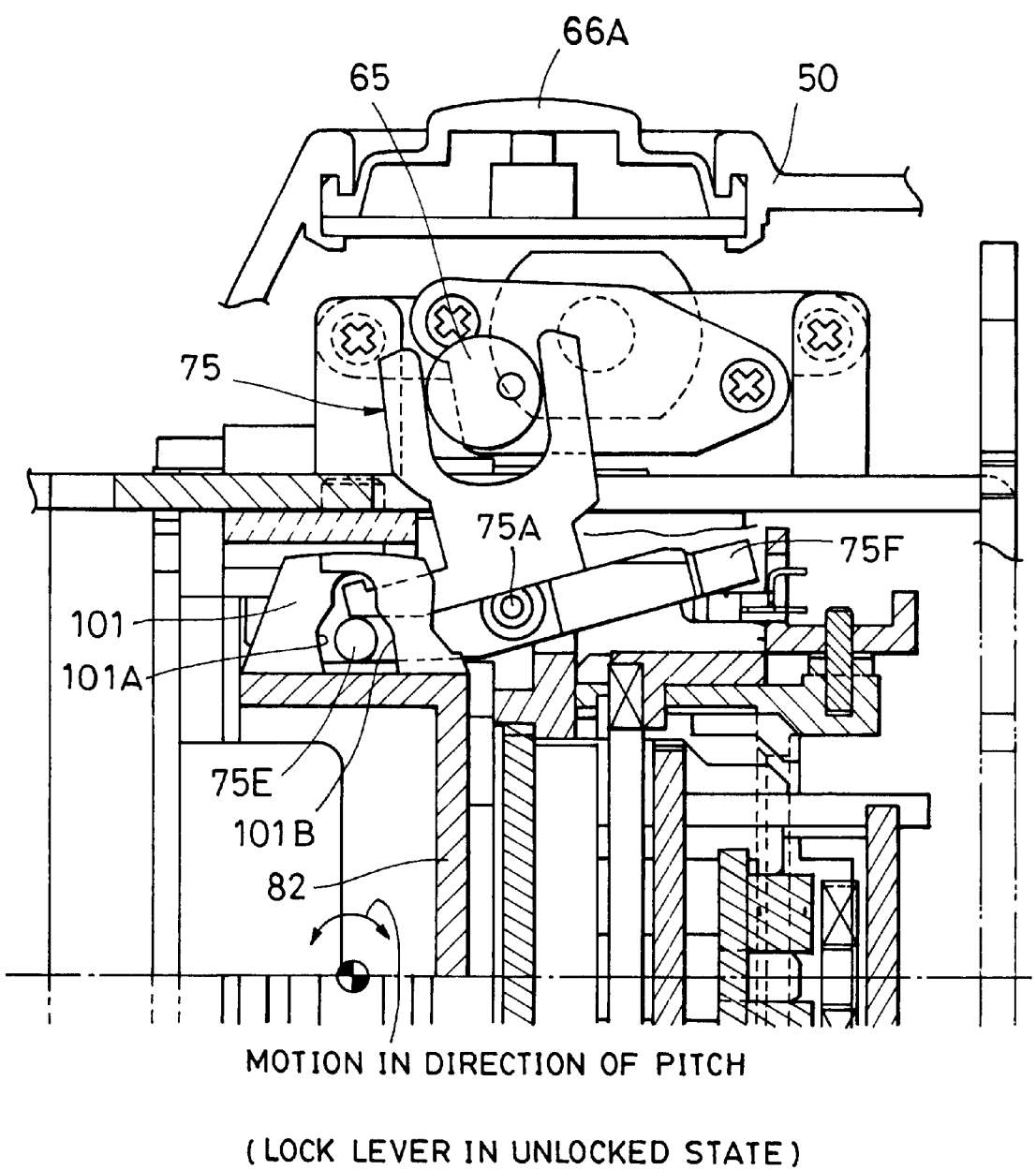
FIG. 10 is an enlarged side sectional view showing an unlocked state of a lock mechanism contained in the binoculars of FIG. 1.

FIG. 9 shows the lock lever 75 in the locked state thereof, and FIG. 10 shows the lock lever 75 in the unlocked state thereof.

Referring to FIG. 4, the lock lever 75 has rotary shafts 75A and 75B on both ends thereof. The rotary shafts 75A and 75B are received in holes (not shown) formed in the corresponding positions of the body 71, and are rotatable in the direction of pitching together with the motor 64 and the cam 65 in motion.

During the locked state as shown in FIG. 9 and FIG. 16, the cam 65 is controlled so that the cylindrical projection 75E projecting from the left end of the lock lever 75 is engaged with the top side of the pitch movement restraint portion 101 arranged in the pitch holding frame 82 and that the pitch holding frame 82 is locked in the position of a pitch direction sensor. Referring to FIG. 10, during the unlocked state, the cam 65 is controlled so that the cylindrical projection 75E drops downward below restraint surfaces 101A and 101B of the pitch movement restraint portion 101. The pitch holding frame 82 is thus movable in the direction of pitching within a range in which the cylindrical projection 75E does not abut the restraint surfaces 101A and 101B.

During the locked state, as shown in FIG. 6, FIG. 9, and FIG. 16, the cylindrical projection 75F projecting from the rear center of the lock lever 75 is received in the recess 111 formed on the bottom of the yaw movement restraint portions 107A and 107B of the yaw drive frame 107, and the yaw drive frame 107 is thus locked in the position of a yaw direction sensor. During the unlocked state, the cylindrical projection 75F is raised between the yaw movement restraint portions 107A and 107B where a wider space is allowed therebetween, from the recess 111 formed on the bottom of the yaw movement restraint portions 107A and 107B. The yaw drive frame 107 is thus allowed to move in the direction of yawing within a range to the abutment to the yaw movement restraint portions 107A and 107B.

A slant surface 75G formed on the rear top of the lock lever 75 pushes upwardly the leaf switch 78 to turn it on during the unlocked state. During the locked state, the lock lever 75 is detached from the leaf switch 78 to turn it off as shown in FIG. 6.

The switching between the locked state and the unlocked state, namely, the operation and the stop of the operation of the image stabilization unit 61, is controlled by pressing the control section 66A of the stabilization switch 66 arranged on the top cover 50. In response to the pressing of the control section 66A, the motor 64 and the cam 65 start rotating. Control of the image stabilization unit 61 is performed by monitoring the state of the leaf switch 78. Each time the stabilization switch 66 is pressed, the image stabilization unit 61 is turned on or off.

Figure 11:
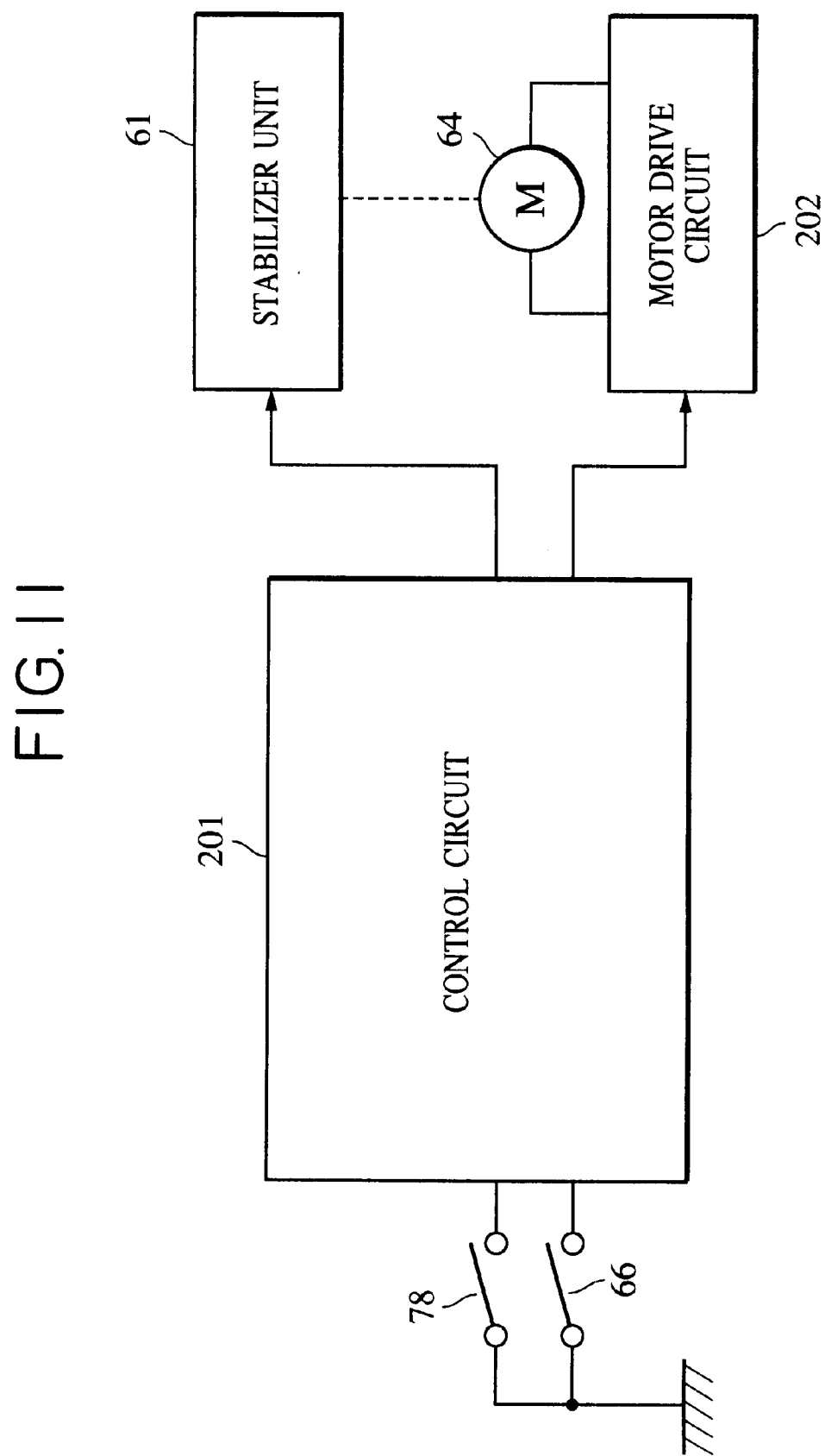
FIG. 11 is a block diagram showing a circuit arrangement for locking and unlocking the stabilization unit for the binoculars shown in FIG. 1.
Figure 12:
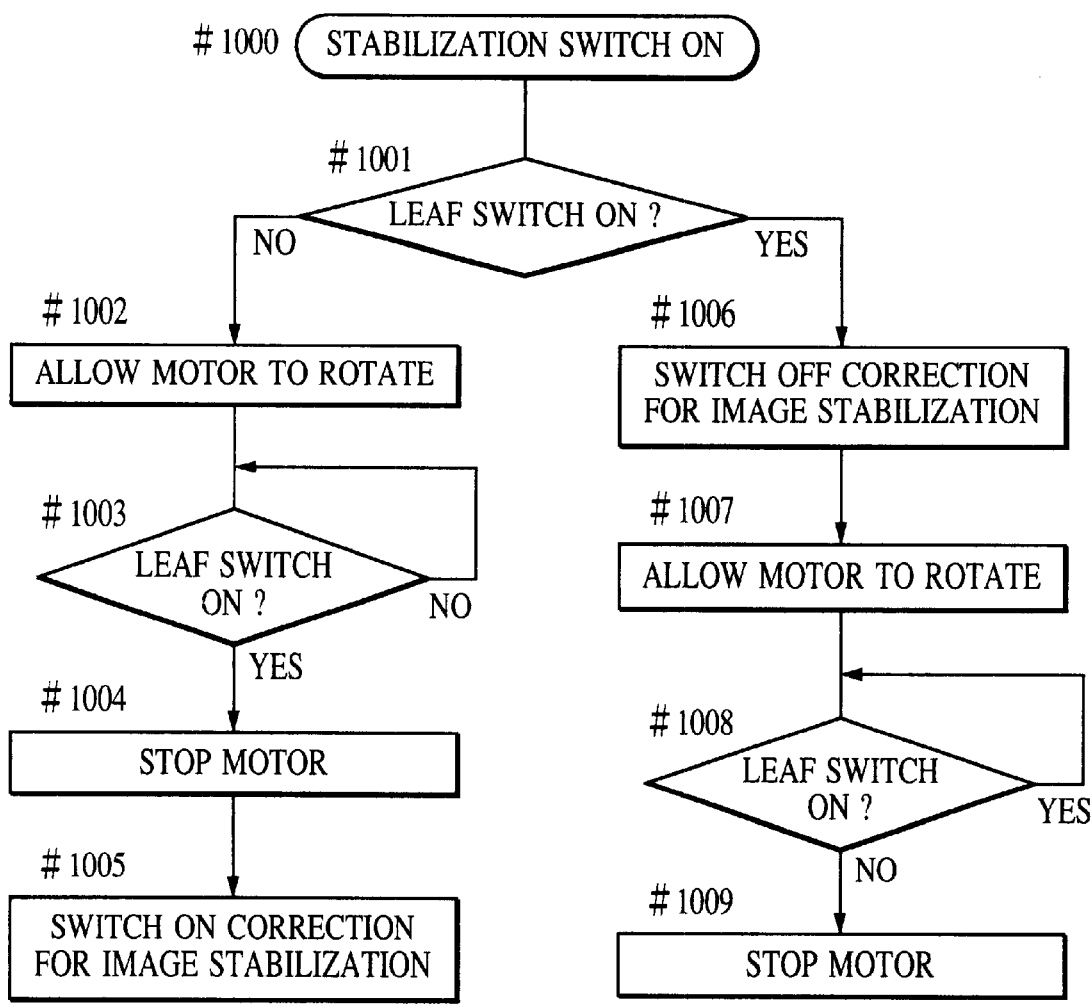
FIG. 12 is a flow chart showing locking and unlocking operations of the stabilization unit of the binoculars shown in FIG. 1.

The control of the operation and the stop of the operation of the electrical circuit board 62, including the switching between the locked state and the unlocked state, is now discussed, referring to FIG. 11 and FIG. 12.

FIG. 11 is a block diagram showing an electrical arrangement relating to the operation and the stop of the operation of the image stabilization unit 61 contained in the binoculars.

A control circuit 201 (mounted on the electrical circuit board 62, for instance) performs electrical control of the binoculars. Receiving state signals from the stabilization switch 66 and the leaf switch 78, the control circuit 201 controls the operation and the stop of the operation of a motor drive circuit 202 for driving the motor 64 for switching between the locked state and the unlocked state and the image stabilization unit 61.

FIG. 12 is a flow chart of a process performed by the control circuit 201. The process is now discussed, referring to FIG. 12.

During the locked state as shown in FIG. 9, the pitch holding frame 82 is engaged with the lock lever 75 in the pitch movement restraint portion 101, and the yaw drive frame 107 is engaged with the lock lever 75 in the recess portion 111. The operation of the image stabilization unit 61 is thus locked. When the control section 66A of the stabilization switch 66 is pressed under this condition, the electrical switch 68 is turned on (#1000). The leaf switch 78 remains turned off (No in #1001). The control circuit 201 allows the motor 64 to rotate through the motor drive circuit 202, thereby causing the cam 65 to rotate (#1002). The lock lever 75 is shifted from the position thereof shown in FIG. 9 to the position thereof shown in FIG. 10, causing the leaf switch 78 to be turned on (#1003). The motor 64 stops rotating (#1004). The leaf switch 78 supplies power to the electrical circuit system including the gyroscopes 98P and 98Y. When the binoculars suffer from hand shake, a current is conducted through the pitch drive coil 85P and the yaw drive coil 85Y in the direction to compensate therefor (#1005).

With the lock lever 75 shifted into the unlocked state, the pitching of the pitch holding frame 82 and the yawing of the yaw drive frame 107 (yaw holding frames 97L and 97R) are permitted to compensate for image blurring.

More specifically, the front frames 100L and 100R of the variable-angle prisms 4L and 4R integrated into the pitch holding frame 82 are pivoted together with the pitch drive frame 102 about the left and right press-fitted pins 95L and 95R, when the drive current corresponding to a vibration signal of the gyroscope 98P is conducted through the pitch drive coil 85P. The amount of rotation is detected by the pitch Hall element 90P.

The yaw holding frames 97L and 97R are pivoted about the press-fitted pins 96L and 96R through the connecting shafts 105L and 105R, when the drive current corresponding to a vibration signal of the gyroscope 98Y is conducted through the yaw drive coil 85Y to drive the yaw drive frame 107. The rear frames 103L and 103R of the variable-angle prisms 4L and 4R integrated with the yaw holding frames 97L and 97R are pivoted about the press-fitted pins 96L and 96R, and the amount of rotation is detected by the yaw Hall element 90Y.

The hand shake of the binoculars is thus corrected.

When the control section 66A of the stabilization switch 66 is pressed with the image stabilization unit 61 operative (with the leaf switch 78 turned on), the electrical switch 68 becomes conductive. The control circuit 201 cuts off power to the electrical circuit system (#1000→#1001→#1006), causes the motor drive circuit 202 to drive the motor 64 (#1007), shifts the lock lever 75 from the position thereof shown in FIG. 10 to the position thereof shown in FIG. 9, and turns off the leaf switch 78 (#1008). The motor 64 is thus stopped (#1009).

With the lock lever 75 shifted to the lock position, the pitch holding frame 82 is engaged with the lock lever 75 in the pitch movement restraint portion 101, and the yaw drive frame 107 is engaged with the lock lever 75 in the yaw limiting portion 111. The operation of the image stabilization unit 61 is thus locked.

On the other hand, if the stabilization switch 66 is pressed with the image stabilization unit 61 inoperative (in the locked state), the locked state is released by the motor 64, and the stabilization operation is initiated (#1002→#1005).

The ON/OFF operation of the image stabilization unit 61 is thus repeated by simply pressing the stabilization switch 66. A user may detach the user's finger from the stabilization switch 66 with the image stabilization unit 61 left operative.

Second Embodiment

Figure 13:
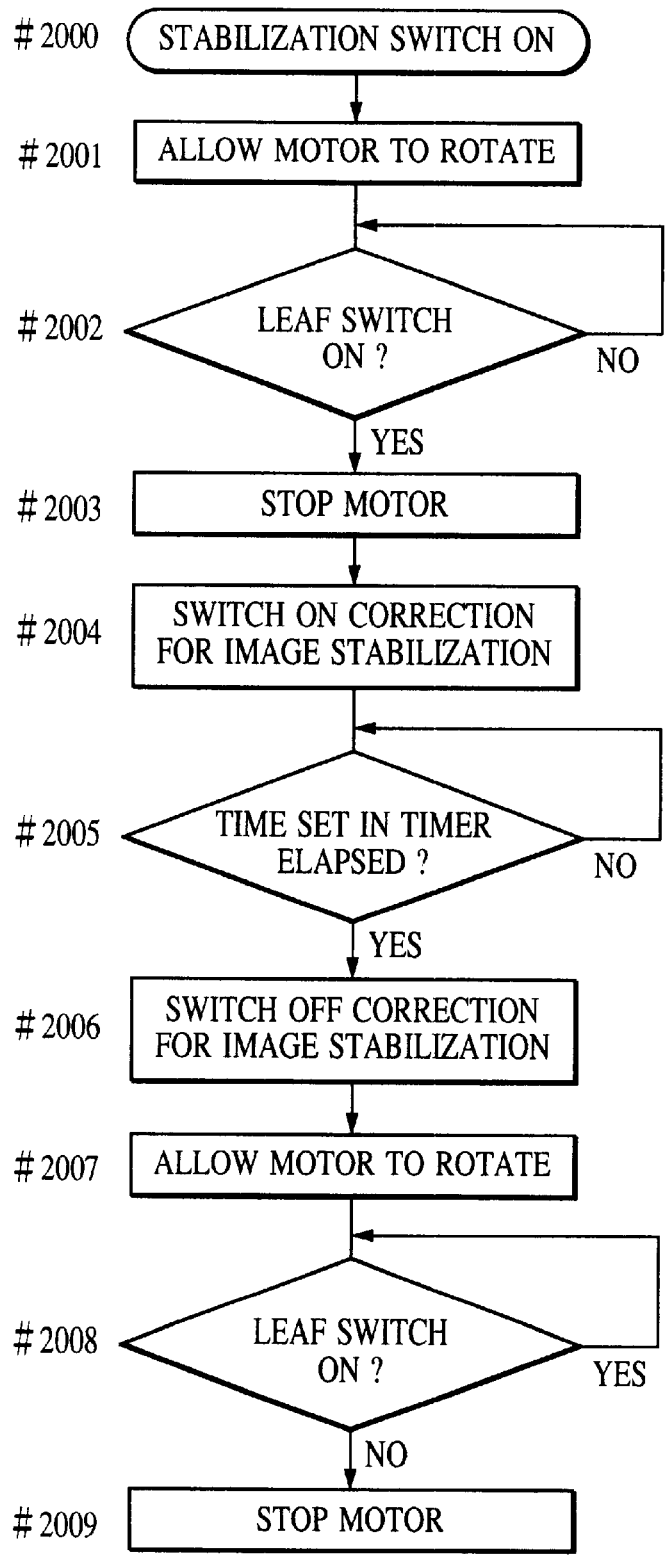
FIG. 13 is a flow chart showing locking and unlocking operations of the stabilization unit of the binoculars of a second embodiment of the present invention.

FIG. 13 is a flow chart showing the process taken by the control circuit when the stabilization switch is pressed in binoculars of a second embodiment of the present invention. The mechanical and electrical construction of the binoculars remains unchanged from that of the first embodiment.

Referring to a flow chart shown in FIG. 13, the control circuit 201 causes the motor drive circuit 202 to drive the motor 64 and the cam 65 (#2000→#2001) when the control section 66A of the stabilization switch 66 arranged in the top cover 50 is pressed. When the leaf switch 78 is turned on (#2002), the motor 64 is stopped (#2003), and the image stabilization unit 61 becomes operative (#2004). When a timer shows an elapse of predetermined time from the start of the image stabilization unit 61 (#2005), the image stabilization unit 61 stops (#2006). The motor 64 rotates (#2007), and the leaf switch 78 is turned off (#2008), and the motor 64 is stopped (#2009).

Once the control switch is pressed, the image stabilization unit 61 returns to the locked state after the stabilization operation. This arrangement prevents power consumption of a battery due to the user's omission of switching off the image stabilization unit 61.

Third Embodiment

Figure 14:
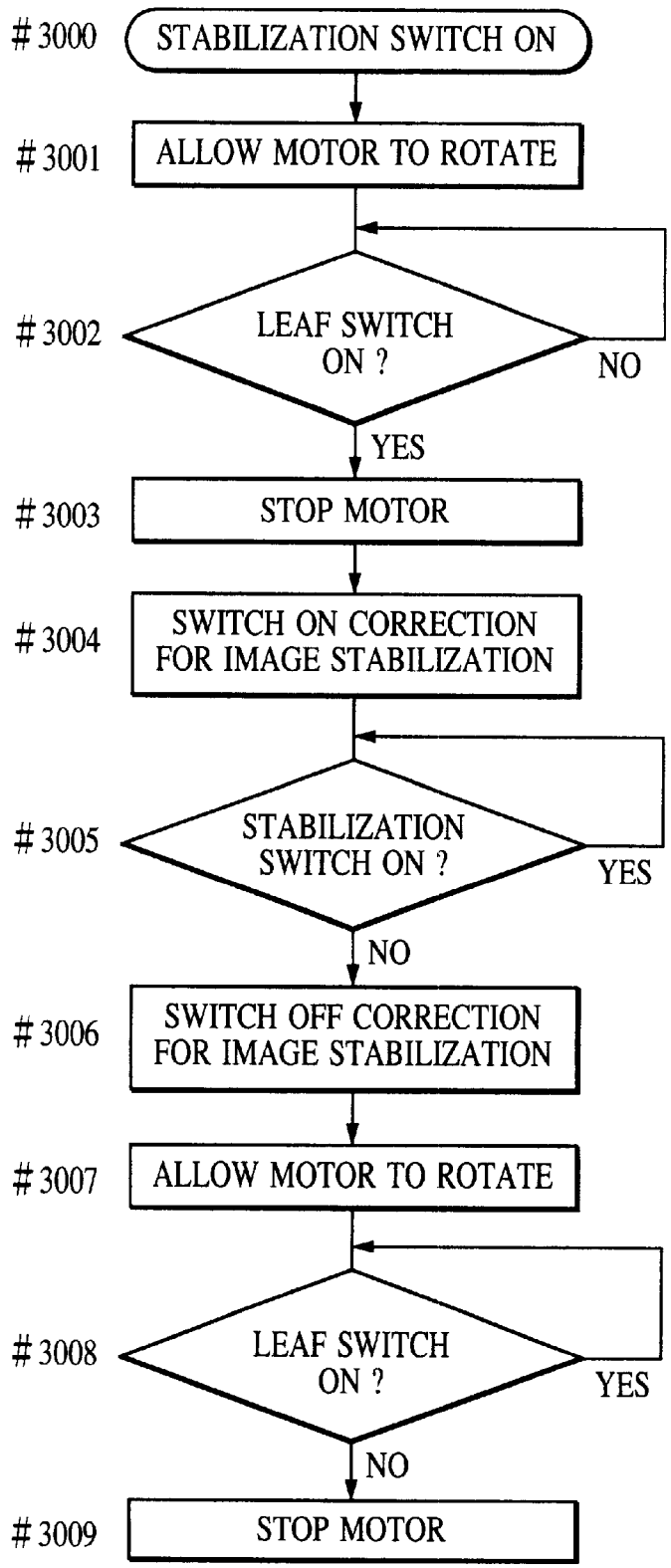
FIG. 14 is a flow chart showing locking and unlocking operations of the stabilization unit of the binoculars of a third embodiment of the present invention.

FIG. 14 is a flow chart showing the process taken by the control circuit when the stabilization switch is pressed in binoculars of a third embodiment of the present invention. The mechanical and electrical construction of the binoculars remains unchanged from that of the first embodiment.

Referring to a flow chart shown in FIG. 14, the control circuit 201 causes the motor drive circuit 202 to drive the motor 64 and the cam 65 (#3000→#3001), when the control section 66A of the stabilization switch 66 arranged in the top cover 50 is pressed. When the leaf switch 78 is turned on (#3002), the motor 64 is stopped (#3003), and the image stabilization unit 61 becomes operative (#4004).

The image stabilization unit 61 continuously operates while the stabilization switch 66 remains pressed (No in #3005). The control circuit 201 stops the image stabilization unit 61 (#3006), and causes the motor drive circuit 202 to drive the motor 64 (#3007). When the leaf switch 78 is turned off (#3008), the motor 64 stops rotating (#3009).

The image stabilization unit 61 continuously operates while the stabilization switch 66 remains pressed. At the moment the finger is detached from the stabilization switch 66, the image stabilization unit 61 is put into the locked state. This arrangement prevents power consumption of the battery due to the user's omission of switching off the image stabilization unit 61.

Figure 15:
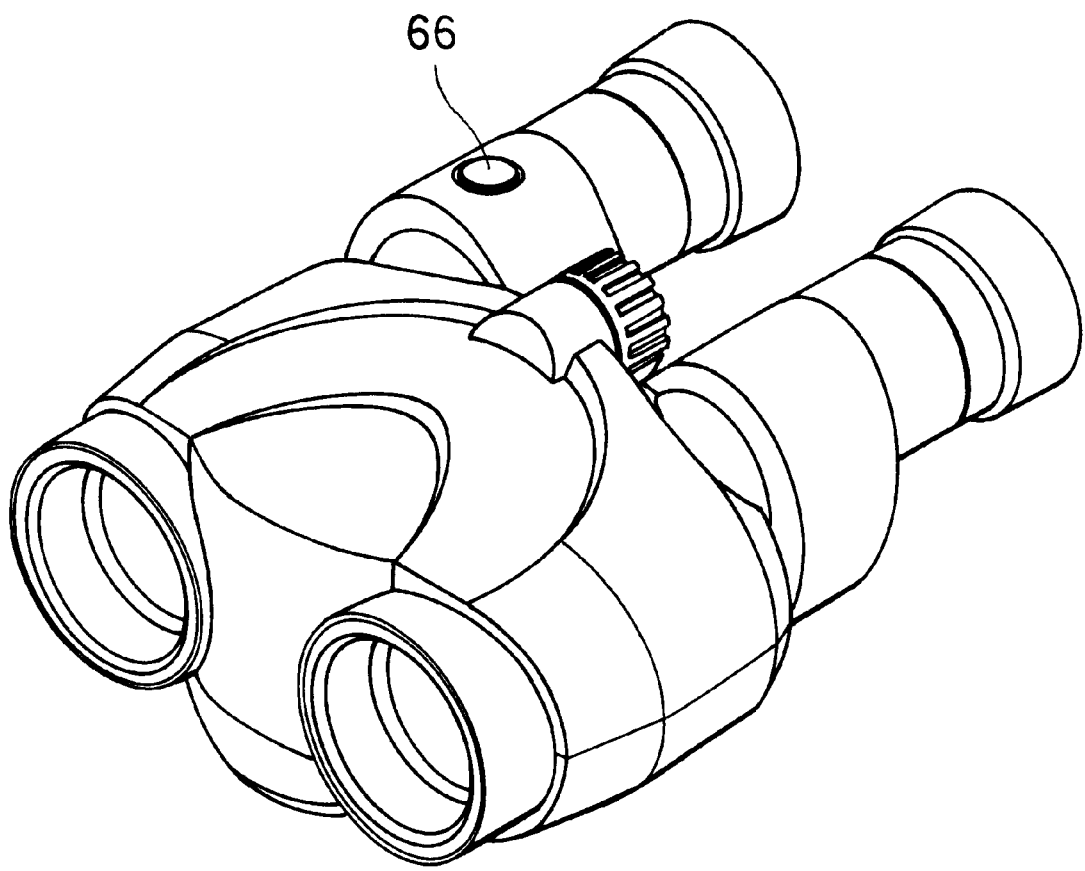
FIG. 15 is a perspective view showing the position of a control member contained in the binoculars of each of the above embodiments of the present invention.

In the above embodiments, the stabilization switch 66 is an electrical switch, and the mounting position thereof is properly set, depending on the size and application of the binoculars. For instance, the stabilization switch 66 may be mounted on the outer housing of the prism container as shown in FIG. 15.

In accordance with the preceding embodiments, the control member is constructed of an electrical switch that is operated in response to a light touch by a finger. The finger may be removed from the control member even while the image stabilization unit 61 is continuously operated. The binoculars may thus be kept at an easily held position, or may be mounted on a tripod with the finger removed therefrom. The ease of use of the binoculars is assured while comfortability in the observation of images for a long period of time is provided.

As described above, the present invention provides the binoculars which present ease of use of a control member for activating an image stabilizer while providing comfortability in the observation of images using an image stabilizer for a long period of time.

What is claimed is:

1. Binoculars comprising:
   a pair of objective optical units;
   a pair of eyepiece lens units for observing an image formed by said pair of objective optical units;
   a pair of corrective optical units, respectively arranged in optical paths of said pair of objective optical units, for correcting image blurring by changing the optical paths;
   a lock member that is shifted between a locked position, in which an operation for changing the optical path of each of said corrective optical units is locked, and an unlocked position, in which the operation for changing the optical path is unlocked;
   drive means for driving said lock member to, and holding said lock member in, one of the locked position and the unlocked position; and
   a control member for activating a drive operation of said drive means, to drive said lock member to the locked position when in the unlocked position, or to drive said lock member to the unlocked position when in the locked position, in response to an input by an operator, wherein said drive means holds said lock member in a selected one of the locked position and the unlocked position after the input by the operator is terminated.

2. Binoculars according to claim 1, wherein said drive means comprises a motor and a cam linked to the motor, and the position of said lock member is changed in response to the rotation of said cam.

3. Binoculars according to claim 1, wherein said control member is a control switch for producing a control signal, and drives said drive means in response to the control signal when said control switch is operated.

4. Binoculars according to claim 1, wherein said control member is a control switch for producing a control signal, and comprises control means which releases said lock member from the locked position in response to the control signal when said lock member is in the locked position, and starts a corrective operation by the pair of the corrective optical units.

5. Binoculars according to claim 1, wherein said control member is a control switch for producing a control signal, and comprises control means which stops the corrective operation by said pair of the corrective optical units in response to the control signal when said lock member is in the unlocked position and drives said drive means to put said lock member into the locked position.

6. Binoculars according to claim 1, wherein said control member is a push-type switch, and every time a pushing operation of said switch is performed, it activates said drive means.

7. Binoculars comprising:

a pair of objective optical units;

a pair of eyepiece lens units for observing an image formed by said pair of objective optical units;

a pair of corrective optical units, respectively arranged in optical paths of said pair of objective optical units, for correcting image blurring by changing the optical paths;

a lock member that is shifted between a locked position, in which an operation for changing the optical path of each of said corrective optical units is locked, and an unlocked position, in which the operation for changing the optical path is unlocked;

an actuator for shifting said lock member to, and holding the lock member in, one of the locked position and the unlocked position; and a control member for activating said actuator to shift said lock member to the locked position when in the unlocked position, or to shift the lock member to the unlocked position when in the locked position, in response to an input by an operator, wherein said actuator holds said lock member in a selected one of the locked position and the unlocked position after the input by the operator is terminated.

8. Binoculars according to claim 7, wherein said control member is a push-type switch, and every time a pushing operation of said switch is performed, said actuator is activated.

9. An observing optical apparatus comprising:

an objective optical unit;

an eyepiece lens unit for observing an image formed by said objective optical unit;

a corrective optical unit, respectively arranged in an optical path of said objective optical unit, for correcting image blurring by changing the optical path;

a lock member that is shifted between a locked position, in which an operation for changing the optical path of said corrective optical unit is locked, and an unlocked position, in which the operation for changing the optical path is unlocked;

an actuator for shifting said lock member to, and holding the lock member in, one of the locked position and the unlocked position; and a control member for activating said actuator to shift said lock member to the locked position when in the unlocked position, or to shift the lock member to the unlocked position when in the locked position, in response to an input by an operator, wherein said actuator holds said lock member in a selected one of the locked position and the unlocked position after the input by the operator is terminated.

10. An apparatus according to claim 9, wherein said control member is a push-type switch, and every time a pushing operation of said switch is performed, said actuator is activated.

11. An apparatus according to claim 9, wherein said actuator comprises a motor and a cam linked to the motor, and the position of said lock member is changed in response to the rotation of said cam.

12. An apparatus according to claim 9, wherein said control member is a control switch for producing a control signal, and activates said actuator in response to the control signal when the control switch is operated.

13. An apparatus according to claim 9, wherein said control member is a control switch for producing a control signal, and comprises control means which releases said lock member from the locked position in response to the control signal when said lock member is in the locked position, and starts a corrective operation by said corrective optical unit.

14. An apparatus according to claim 9, wherein said control member is a control switch for producing a control signal, and comprises control means which stops the corrective operation by said corrective optical unit in response to the control signal when said lock member is in the unlocked position and drives said actuator to put said lock member into the locked position.

* * * * *

UNITED STATES PATENT AND TRADEMARK OFFICE
CERTIFICATE OF CORRECTION

PATENT NO.     : 6,545,806 B2
DATED          : April 8, 2003
INVENTOR(S)    : Hidefumi Notagashira It is certified that error appears in the above-identified patent and that said Letters Patent is hereby corrected as shown below:

<u>Title page,</u>
Item [57], ABSTRACT,
Line 1, "includes" should read -- include --.

<u>Column 1,</u>
Line 30, "includes" should read -- include --.

<u>Column 2,</u>
Line 45, "are" should be deleted.

<u>Column 3,</u>
Line 5, "support" should read -- supports --.

<u>Column 6,</u>
Line 8, "stabilizating" should read -- stabilization --.

<u>Column 8,</u>
Line 40, "has" should read -- have --.

Signed and Sealed this

Eleventh Day of November, 2003

JAMES E. ROGAN
*Director of the United States Patent and Trademark Office*